June 6, 1967 G. H. CANNON 3,323,576
SOLID FUEL AND HEATING ELEMENT
Original Filed Dec. 15, 1958 3 Sheets-Sheet 1

INVENTOR.
Guy H. Cannon
BY
Griswold & Burdick
ATTORNEYS

INVENTOR.
Guy H. Cannon
BY
Griswold & Burdick
ATTORNEYS

June 6, 1967  G. H. CANNON  3,323,576
SOLID FUEL AND HEATING ELEMENT
Original Filed Dec. 15, 1958  3 Sheets-Sheet 3

INVENTOR.
Guy H. Cannon
BY
Griswold & Burdick
ATTORNEYS 3,323,576
SOLID FUEL AND HEATING ELEMENT
Guy H. Cannon, Midland, Mich., assignor to The Dow Chemical Company, Midland, Mich., a corporation of Delaware
Original application Dec. 15, 1958, Ser. No. 780,461, now Patent No. 3,047,487, dated July 31, 1962. Divided and this application Nov. 25, 1960, Ser. No. 72,545
6 Claims. (Cl. 165—1)

This application is a division of application Ser. No. 780,461 filed Dec. 15, 1958, now Patent No. 3,047,487 granted July 31, 1962.

This invention relates to heat transfer means, and is more particularly concerned with S-shaped solid fuel and heating elements.

The British "Calder Hall" nuclear reactor is a graphite moderated, gas-cooled, thermal reactor which has been in operation at Cumberland, England since May of 1956. This reactor uses as fuel natural uranium rods which are encapsulated inside of magnesium-alloy fin tubes. The coolant is $CO_2$ gas under about 120 p.s.i. pressure. It enters the bottom of the reactor core at about 140° C. and is heated to about 334° C. by the time it leaves the top of the reactor. The temperature at the center of the uranium fuel-rod is in excess of 500° C. at its hottest point. As high operating temperatures increase operating hazards and adversely affect the life of solid heater elements, it is desirable to increase the total heat output without increasing either the surface or central uranium fuel-rod temperatures.

It is a principal object of the present invention to provide a new form of heating element which will permit (a) heating the same quantity of a heat-transfer fluid to the same temperature but with heater elements operating at lower temperatures, and having a corresponding longer life, or, (b) heating a larger quantity of a heat-transfer fluid to the same temperature with heater elements operating at the same temperature and life expectancy, or, (c) heating the same quantity of a heat-transfer fluid to a higher temperature with the heater element operating at the same temperature and life expectancy.

It is a further object to provide new S-shaped fuel and heating elements which increase the total heat output using the same materials of construction and the same temperature limitations.

Other objects will become apparent hereinafter.

Figure 11:
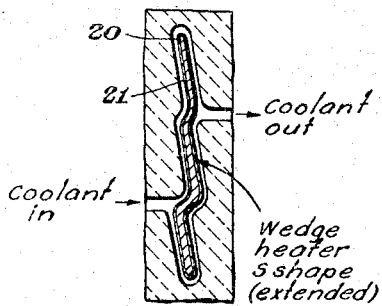
Figure 12:
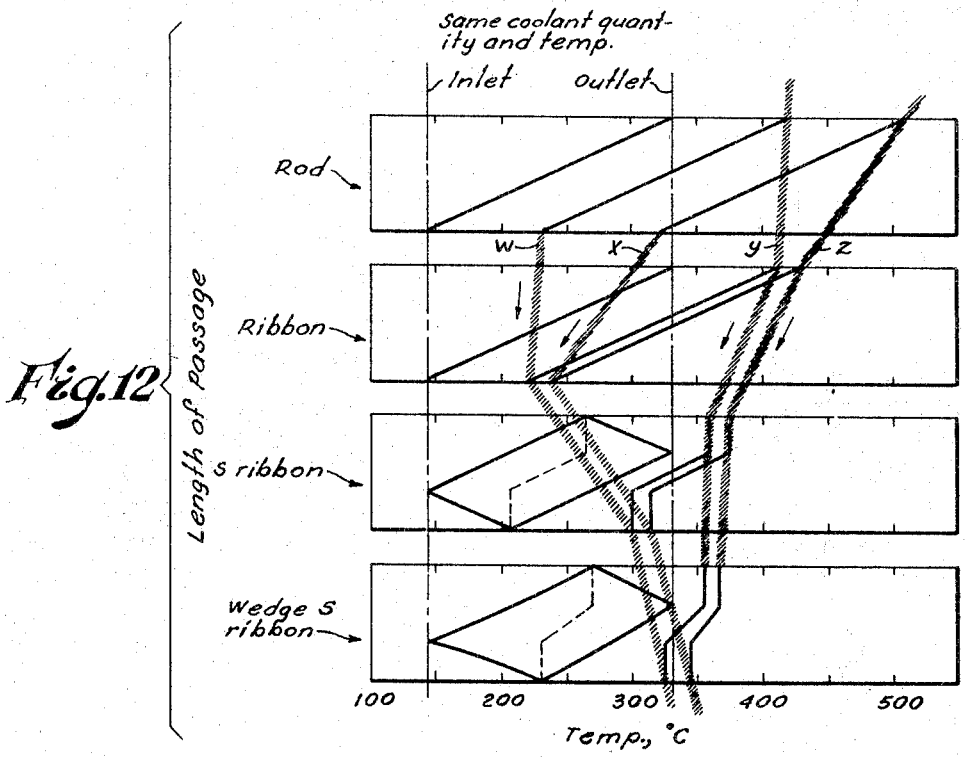

FIGURE 12 summarizes and compares the performance of the four shapes of heaters (FIGURES 8 through 11) when heating the same quantity of heat-transfer fluid the same amount. The rod form (FIGURE 8) shows the highest heater temperature and the largest variations in heater temperature. The wedge S-shaped ribbon form (FIGURE 11) shows the lowest heater temperature and the least variation in heater temperature.

Figure 1:
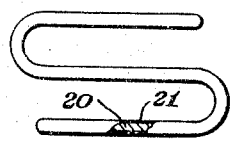
FIGURE 1 is a side view of the fuel element of the present invention.
Figure 2:
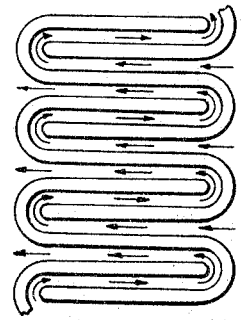
FIGURE 2 illustrates three fuel elements of the present invention interlocked as they are when in use.
Figure 3:
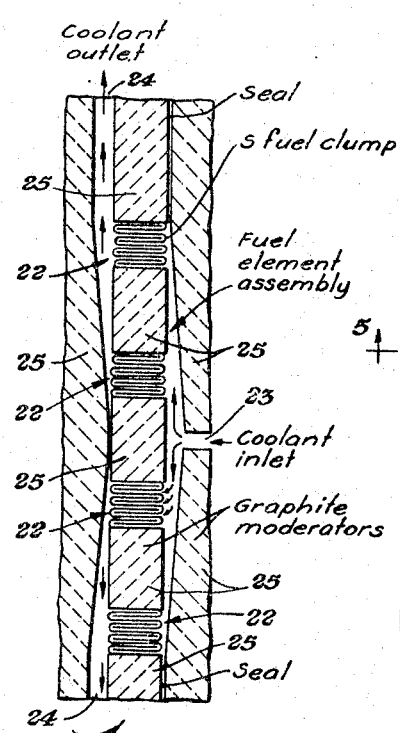
FIGURE 3 is a cross-sectional view of a nuclear reactor core and indicates one arrangement of clumps of wedge-S-shaped fuel elements within the reactor core which is contemplated in this invention.
Figure 4:
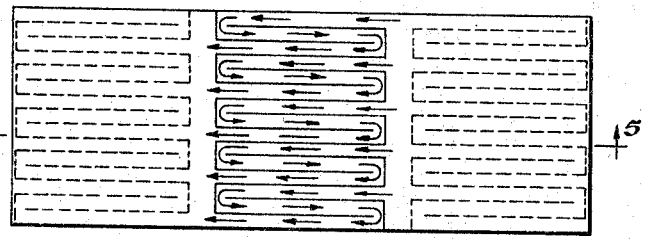
FIGURE 4 is a top view of a ribbed fuel element before bending into S-shape.
Figure 5:
FIGURE 5 is a sectional elevation of the ribbed element of FIGURE 4, taken along line 5—5 of FIGURE 4.
Figure 6:
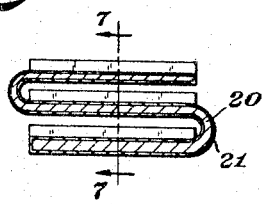
FIGURE 6 is a side view of the element of FIGURE 4 after it is bent into S-shape.
Figure 7:
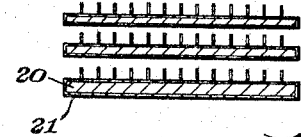
FIGURE 7 is a cross-sectional view of the element of FIGURE 6, taken along line 7—7 of FIGURE 6.

Referring now to FIGURE 1 through FIGURE 7, uranium 20 is contained within a magnesium container 21. The desired quantity of uranium alloy is placed in a die and stamped or pressed to form a rectangular plate having constant length and width but varying thickness depending upon the quantity of alloy initially fed into the die. This fuel plate is then clad and bonded on all sides wth magnesium alloy to form a tight enclosure with good heat-transfer properties from fuel to cladding. The clad plate is then bent at two points so that the ends face in opposite directions, that is, into an S-shape as shown in FIGURE 6. The magnesium cladding can also have ribs on the outside so that, after bending into S-shape, the individual elements can be positioned in an interlocking manner as shown in FIGURE 2, whereby passages will be formed through which gaseous coolant must flow to remove heat. As can be seen in FIGURE 2, the heat transfer fluid will contact the legs of the heating elements at successively different temperature differentials on each side. FIGURE 4 illustrates the top view of one of these ribbed fuel elements before it is bent into S-shape, and indicates the multi-pass path the coolant must take as it is forced between the magnesium ribs and over each leg of the fuel element and finally emerges on the other side. FIGURE 5 is a sectional elevation of the ribbed element of FIGURE 4, taken along line 5—5 of FIGURE 4 showing the relationship of the ribs, the magnesium cladding and the nuclear fuel. FIGURE 6 is a side view of the element of FIGURE 4 after it is bent into an S-shape, and FIGURE 7 is a cross-sectional view of the element of FIGURE 6, taken along line 7—7 of FIGURE 6, showing the new relationship of the ribs, the magnesium cladding and the nuclear fuel.

The interlocked assembly of FIGURE 2 may be positioned within the nuclear reactor in approximately cubical clumps as shown in FIGURE 3, wherein 22 is the interlocked assembly of S-shaped fuel elements, 23 is the coolant inlet, 24 the coolant outlets, and 25 the graphite moderator of the nuclear reactors. Fuel clumps can have uniform geometrical arrangement as shown or the fuel element assembly can be uniformly spaced in the reactor core and the individual fuel clumps have variable spacing along each fuel element assembly. The coolant is forced into the fuel area at 23, by any suitable means, such as pumping, and must flow through the S-shaped fuel clumps while passing from the inlet duct 23, to the exhaust duct 24, with the result that the fuel plate legs are cooled on one side with relatively cold coolant and on the other side wth relatively hot coolant. The total amount of fuel used in each S-shaped fuel segment is varied in accordance with the subsequent location within the reactor core, and the distribution of fuel within each element is varied in accordance with the position of the element relative to the coolant flow. Variations in neutron flux density occurring in the reactor core can be compensated to some extent by employing fuel clumps with adjusted fuel content and coolant thruput. These adjustments can be made by modifying the heighth of external ribs which effect the passageway for coolant flow and thickness of fuel in the element. These changes can be made in a manner to leave the assembled fuel clumps with substantially the same overall dimensions. Fuel clumps containing more fuel and less passageway for coolant flow can be positioned away from the center of the reactor core. In this manner, fuel clump proportions can be so adjusted that all coolant will be heated to substantialy the same temperature regardless of the path taken by the coolant in flowing through the reactor core.

Solid ribbon heater elements with uniform rectangular cross-section have less average distance for heat to travel from where it is produced within the heater element to the exterior heat-transfer surface, and more surface for heat transfer per unit area of heater cross-section than solid wires or rods of circular cross-section. Extended heat transfer surfaces or ribs can be applied in either case, and if applied equally per unit of surface to do not alter this relationship.

The quantity of heat transmitted from heater to coolant is expressed by the formula:

$$Q = S \Delta T K$$

where $Q$ = total heat transmitted, B.t.u./hr.
$S$ = heat transfer surface, sq. ft.
$\Delta T$ = log mean temperature difference, °F.
$K$ = overall coefficient of heat transmission, B.t.u./hr./sq. ft./°F. $\Delta T$.

For convenience in the discussion which follows, the coefficient K is assumed to be substantially the same for all heater forms.

Figure 8:
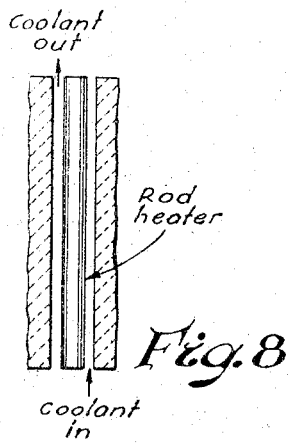
FIGURES 8 through 11 are diagrammatic sketches of rod, ribbon, S-shaped ribbon, and wedge S-shaped ribbon heating elements with accompanying graphs (8A through 11A) which indicate the effect these various elements give when identical quantities of coolant are passed over their surfaces.
Figure 8A:
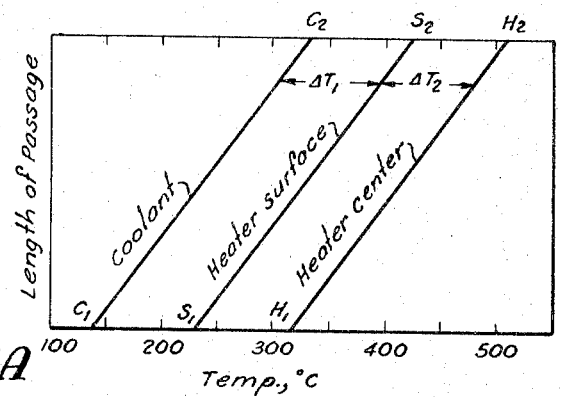

FIGURE 8 shows a rod having a relatively low surface to volume ratio, and FIGURE 8A shows the effect of using this rod heater to heat a certain quantity of coolant from temperature $C_1$ to $C_2$ with required temperature difference $\Delta T$, between coolant temperature ($C_1$–$C_2$) and heater surface temperature ($S_1$–$S_2$), also with temperature difference $\Delta T_2$ between the heater center temperature ($H_1$–$H_2$) and the heater surface temperature ($S_1$–$S_2$).

Figure 9:
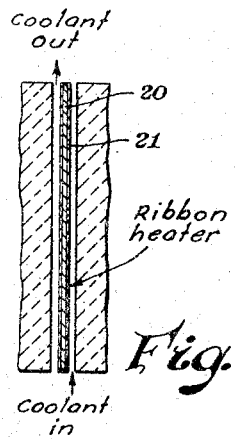
Figure 9A:
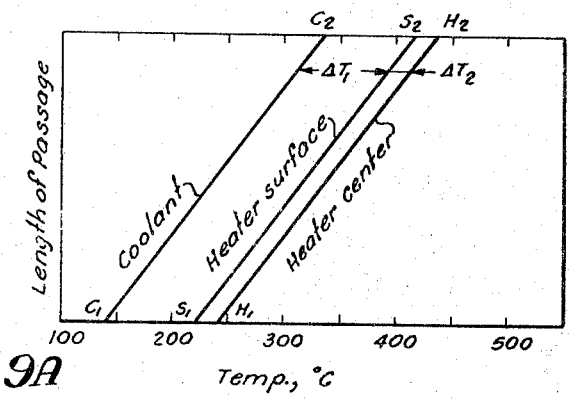

FIGURE 9 shows a ribbon heater having a relatively high surface to volume ratio, and FIGURE 9A shows the effect of using a ribbon heating element built from the same materials, having the same capacity as the rod heater of FIGURE 8, and used for heating the same quantity of coolant the same amount. All other conditions being equal, $\Delta T_1$ in FIGURE 9A will be less than $\Delta T_1$ in FIGURE 8A by the ratio of the heat-transfer surface of the heater of FIGURE 8 divided by the heat-transfer surface of the heater of FIGURE 9. Also, temperature difference $\Delta T_2$ in FIGURE 9A will be less than $\Delta T_2$ in FIGURE 8A by the ration of distance through which heat must flow from the center-to-surface of the element of FIGURE 9 divided by the corresponding distance from the center-to-surface of the element of FIGURE 8. The combined effect is that the ribbon heater of FIGURE 9 will do the same work as the rod heater of FIGURE 8 but do it with a maximum central temperature lower than the corresponding central temperature in the rod heater of FIGURE 8.

Figure 10:
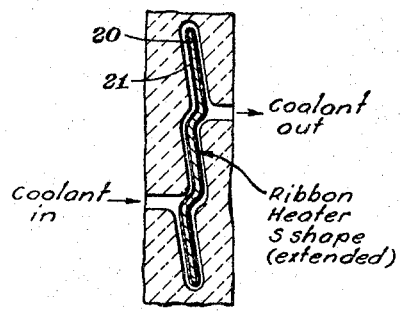
Figure 10A:
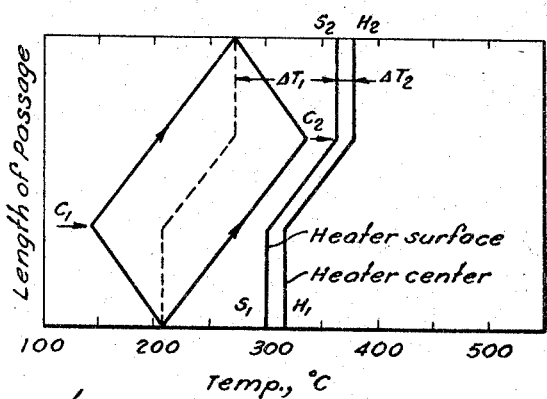

FIGURE 10 diagrams a heater element of FIGURE 9 after it is reshaped in a manner which causes the coolant flow to enter and leave at some intermediate point as shown. This heater element has coolant at one temperature on one side simultaneously with coolant at a different temperature on its opposite side. Allowing $\Delta T_1$ and $\Delta T_2$ in FIGURE 10A the same as corresponding $\Delta T_1$ and $\Delta T_2$ in FIGURE 9A, FIGURE 10A shows that S-shaped elements will do the same work as the elements of FIGURES 8 and 9 but will accomplish it with a maximum central temperature which is considerably lower than the central temperature of the elements in FIGURES 8 and 9.

Figure 11A:
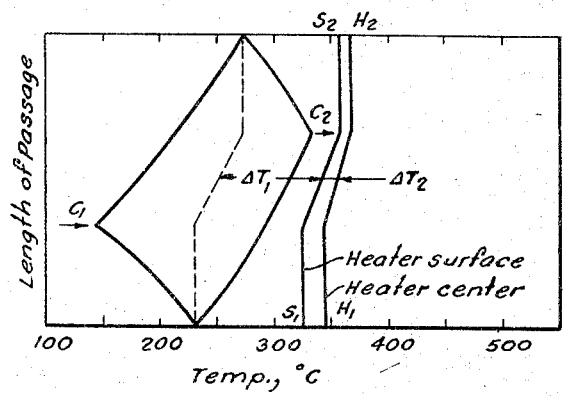

FIGURE 11A shows the effect of redistributing the heater mass by placing more mass, and hence more heat, near the inlet where the coolant is cold, and less mass, and thus less heat near the outlet where the coolant is hot. It is to be noted that the wedge S-heater of FIGURE 11, doing the same work with the same total mass and the same average heat-heads $\Delta T_1$ and $\Delta T_2$ as a FIGURE 10A, will have a minimum heater center temperature $H_2$ which approaches coolant outlet temperature $C_2$ as a limit. It is also to be noted that heater center temperature, $H_1$ of FIGURE 11A, will be higher than the corresponding point $H_1$ of FIGURE 10A, and will approach $H_2$ of FIGURE 11A as a limit.

Thus, it is seen that heater elements of FIGURES 8, 9, 10 and 11 all have the same output per unit of mass and heat the same quantity of coolant the same amount when it is assumed that all have the same coefficient of heat transmission. From FIGURE 8A, the rod heater form shows the highest required heater surface temperature and the highest required heater center temperature. From FIGURE 11A, the wedge S-heater form, wherein the nuclear fuel is unevenly distributed, shows the lowest required heater surface temperature and lowest required heater center temperature.

FIGURE 12 summarizes and compares the performance of the four types of heaters illustrated in FIGURES 8 through 11, and shows that the major benefit gained by changing from rod to ribbon shape is a large decrease in maximum and minimum central temperatures as indicated by lines Z and X, respectively. It further shows that by substituting the S-shaped ribbon for the straight ribbon, the mapor improvements gained are a general leveling-up of all heater temperatures. This is accomplished by large decreases in maximum surface and central temperatures (lines Y and Z, respectively) combined with large increases in minimum surface and central temperatures (lines W and X, respectively). Finally, the wedge S-shaped ribbon form, FIGURE 11, shows a further improvement in both minimum surface and minimum central temperature (lines W and X, respectively) over the plain S-shaped ribbon of FIGURE 10.

Thus, the present invention provides a heat transfer unit which comprises a heating element having at least two sides, and means for forceably contacting a heat-transfer fluid with at least two of said sides, the contacting being at successively different temperature differentials at each of said sides, whereby the heating element is contacted with a heat-transfer fluid at one temperature on one side while being simultaneously contacted with the same heat-transfer fluid at a different temperature on another side.

It is well known that high operating temperatures affect the life of solid heater elements. The use of this invention will permit heating the same quantity of heat-transfer fluids to the same temperature but with heater elements operating at lower temperatures and with corresponding longer lives. It will also permit heating a larger quantity of heat-transfer fluid to the same temperature with heater elements operating at the same temperature and life expectancy, or it will permit heating the same quantity of heat-transfer fluid to a higher temperature with heater elements operating at the same temperature and life expectancy.

While the invention has been specifically described with magnesium as the cladding material, other appropriate cladding materials may be used, such as aluminum, zirconium, etc. Similarly, natural uranium, enriched uranium, and other fissionable materials such as uranium 233 and plutonium may be substituted for the heat source shown. Heat-transfer fluids which are suitable include, for example, carbon dioxide, helium, air, steam, etc. Flowing liquids such as water, Dowtherm, molten sodium, molten potassium, alloys thereof, and the like are not excluded.

Various modifications may be made in the present invention without departing from the spirit or scope thereof, and it is to be understood that I limit myself only as defined in the appended claims.

What is claimed is:

1. The process which comprises providing a heating element having a solid cross-sectional area and at least 2 sides, and forceably contacting the same heat transfer fluid successively with at least 2 of said sides, at different temperature gradients.

2. A heat transfer unit which comprises heating elements having a solid cross-sectional area and at least 2 sides, and means for forceably contacting the same heat transfer fluid successively with at least 2 of said sides at different temperature gradients.

3. A heat transfer unit which comprises a heat-producing element having a solid cross-sectional area and heat-transfer surfaces and a heat-transfer fluid flowing over said surfaces, and wherein one side of said element is contacted by said heat-transfer fluid at one temperature while simultaneously the opposite side of said element is contacted by said heat-transfer fluid at a different temperature.

4. The process which comprises providing a heating element having a solid cross-sectional area, said heating element being adapted to be contacted by a heat transfer fluid, said element having at least 2 sides enclosing an unevenly distributed heating mass wherein more of the heating mass is positioned where it will be contacted by the heat transfer fluid at its lowest temperature and less of the heating mass is positioned where it will be contacted by the heat transfer fluid at its highest temperature, and forcibly contacting the heat transfer fluid successively with at least 2 of said sides, at different temperature gradients.

5. A heat transfer unit which comprises heating elements having a solid cross-sectional area, said elements being adapted to be contacted by a heat transfer fluid, said elements having at least two sides; an unevenly distributed heating mass wherein more of the heating mass is positioned where it will be contacted by the heat transfer fluid at its lowest temperature and less of the heating mass is positioned where it will be contacted by the heat transfer fluid at it highest temperature; and means for forcibly contacting the heat transfer fluid successively with at least two of said sides at different temperature gradients.

6. A heat transfer unit which comprises a heat-producing element having a solid cross sectional area, said element being adapted to be contacted by a heat transfer fluid, said element having heat-transfer surfaces enclosing an unevenly distributed heating mass wherein more of the heating mass is positioned where it will be contacted by the heat transfer fluid at its lowest temperature and less of the heating mass is positioned where it will be contacted by the heat transfer fluid at its highest temperature; and wherein one side of said element is contacted by said heat-transfer fluid at one temperature while simultaneously the opposite side of said element is contacted by said heat-transfer fluid at a different temperature.

References Cited
UNITED STATES PATENTS

| | | | |
|---|---|---|---|
| 2,159,571 | 5/1939 | Stack | 164—135 |
| 2,372,079 | 3/1945 | Munter | 165—141 |
| 2,439,208 | 4/1948 | Gloyer | 257—241 |
| 2,824,724 | 2/1958 | Porsche | 257—241 |
| 2,950,094 | 8/1960 | Garmy | 257—250 |

ROBERT A. O'LEARY, *Primary Examiner.*

HERBERT L. MARTIN, FREDERICK L. MATTESON, Jr., *Examiners.*

CHARLES SUKALO, *Assistant Examiner.*